(12) United States Patent
Parenti et al.

(10) Patent No.: US 11,930,302 B2
(45) Date of Patent: Mar. 12, 2024

(54) ENHANCED SENSOR OPERATION

(71) Applicants: Ford Global Technologies, LLC, Dearborn, MI (US); Board of Trustees of Michigan State University, East Lansing, MI (US)

(72) Inventors: Robert Parenti, Dearborn, MI (US); Adil Siddiqui, Farmington Hills, MI (US); Mahmoud Yousef Ghannam, Canton, MI (US); Yasodekshna Boddeti, East Lansing, MI (US)

(73) Assignees: Ford Global Technologies, LLC, Dearborn, MI (US); Board of Trustees of Michigan State University, East Lansing, MI (US)

( * ) Notice: Subject to any disclaimer, the term of this patent is extended or adjusted under 35 U.S.C. 154(b) by 256 days.

(21) Appl. No.: 17/171,352

(22) Filed: Feb. 9, 2021

(65) Prior Publication Data
US 2022/0256123 A1 Aug. 11, 2022

(51) Int. Cl.
*H04N 7/18* (2006.01)
*B60H 1/00* (2006.01)
(Continued)

(52) U.S. Cl.
CPC ......... *H04N 7/188* (2013.01); *B60H 1/00742* (2013.01); *B60H 1/00871* (2013.01); *B60R 21/01538* (2014.10); *B60R 21/01542* (2014.10); *G06F 18/22* (2023.01); *G06N 5/04* (2013.01); *G06N 20/00* (2019.01); *G06T 7/73* (2017.01); *G06V 10/147* (2022.01); *G06V 20/59* (2022.01);
(Continued)

(58) Field of Classification Search
CPC .............. H04N 7/188; B60R 21/01538; B60R 21/01542; G06T 7/73; G06T 7/70; G06V 20/593; G06V 10/82; G06V 40/161
See application file for complete search history.

(56) References Cited

U.S. PATENT DOCUMENTS 8,614,411 B2    12/2013  Chen et al.
9,690,984 B2     6/2017  Butler et al.
(Continued)

OTHER PUBLICATIONS

Feng et al., "2D3D-MatchNet: Learning to Match Keypoints Across 2D Image and 3D Point Cloud", arXiv:1904.09742v1 [cs.CV] Apr. 22, 2019.

*Primary Examiner* — Rowina J Cattungal
(74) *Attorney, Agent, or Firm* — Brandon Hicks; Bejin Bieneman PLC

(57) ABSTRACT

A two-dimensional image of a vehicle occupant in a vehicle is collected. The collected two-dimensional image is input to a machine learning program trained to output one or more reference points of the vehicle occupant, each reference point being a landmark of the vehicle occupant. One or more reference points of the vehicle occupant in the two-dimensional image is output from the machine learning program. A location of the vehicle occupant in an interior of the vehicle is determined based on the one or more reference points. A vehicle component is actuated based on the determined location. For each of the one or more reference points, a similarity measure is determined between the reference point and a three-dimensional reference point, the similarity measure based on a distance between the reference point and the three-dimensional reference point.

26 Claims, 4 Drawing Sheets

(51) Int. Cl.

| | |
|---|---|
| *B60R 21/015* | (2006.01) |
| *G06F 18/22* | (2023.01) |
| *G06N 5/04* | (2023.01) |
| *G06N 20/00* | (2019.01) |
| *G06T 7/73* | (2017.01) |
| *G06V 10/147* | (2022.01) |
| *G06V 20/59* | (2022.01) |
| *G06V 40/10* | (2022.01) |
| *G06V 40/20* | (2022.01) |
| *H04N 13/204* | (2018.01) |
| *H04N 23/90* | (2023.01) |

(52) U.S. Cl.
CPC .............. *G06V 40/10* (2022.01); *G06V 40/20* (2022.01); *H04N 13/204* (2018.05); *H04N 23/90* (2023.01); *G06T 2207/20081* (2013.01); *G06T 2207/30196* (2013.01); *G06T 2207/30268* (2013.01)

(56) References Cited

U.S. PATENT DOCUMENTS

| | | | |
|---|---|---|---|
| 9,975,689 | B2 | 5/2018 | dos Santos Mendonca et al. |
| 10,628,667 | B2* | 4/2020 | Porikli ................... G06V 10/25 |
| 11,485,308 | B2* | 11/2022 | Torabi ................... B60W 50/14 |
| 2022/0114817 | A1* | 4/2022 | Gronau ................ G06V 10/454 |
| 2022/0232162 | A1* | 7/2022 | Gupta .................... H04N 23/63 |
| 2022/0292705 | A1* | 9/2022 | Friedman ............... G06V 10/82 |

\* cited by examiner

ENHANCED SENSOR OPERATION

BACKGROUND

Vehicles can be equipped with computing devices, networks, sensors and controllers to acquire data regarding the vehicle's environment and occupants in the vehicle to operate the vehicle based on the data. For example, the computer can track or monitor the occupants and actuate one or more components based on the tracking or monitoring. The computer manages limited computational resources used by the sensors and controllers to collect the data and actuate the components in the vehicle.

DETAILED DESCRIPTION

Figure 1:
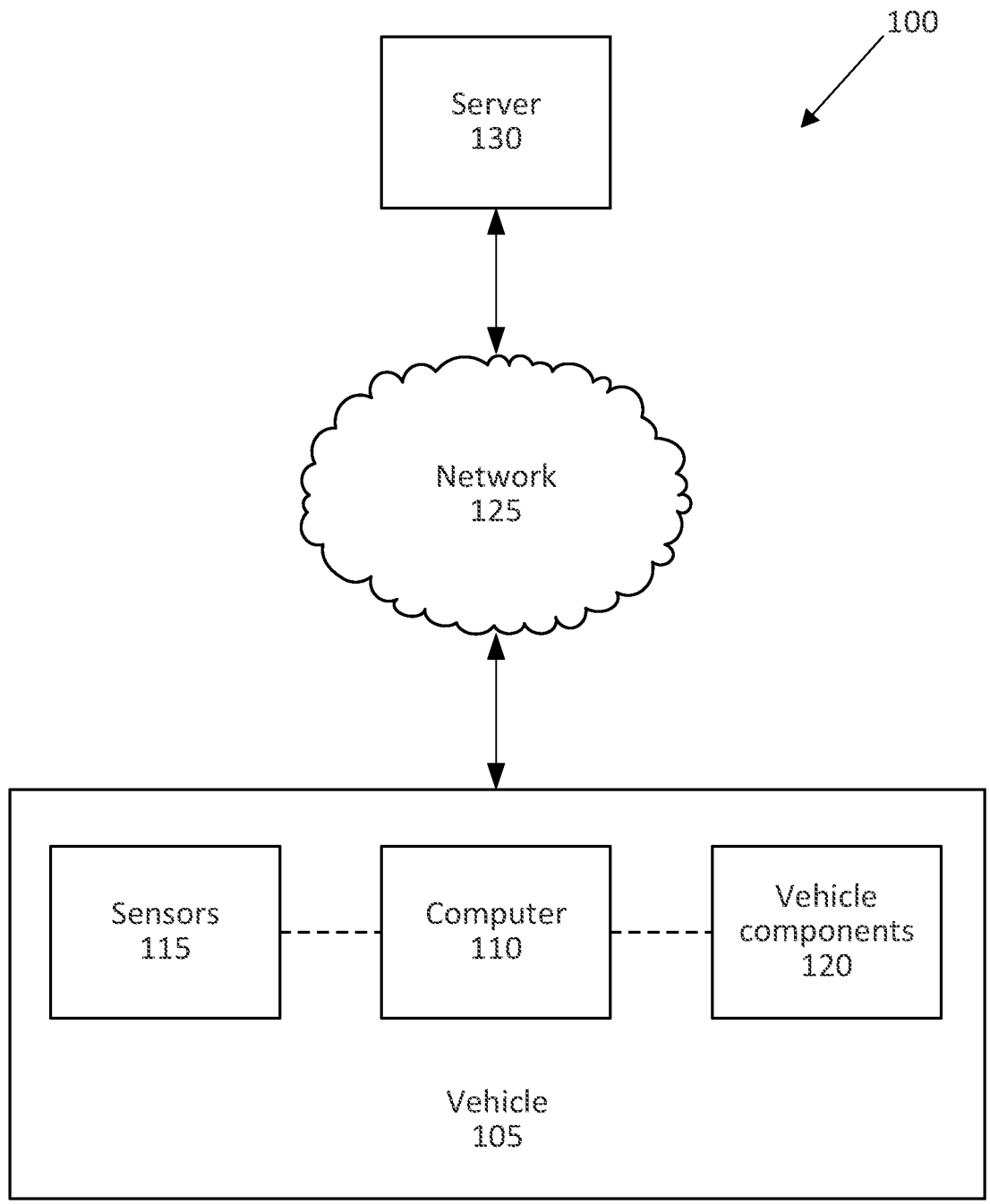
FIG. 1 is a block diagram of an example system for actuating sensors in a vehicle.

A system includes a three-dimensional image sensor, a two-dimensional image sensor, and a computer communicatively coupled to the three-dimensional image sensor and the two-dimensional image sensor. The computer includes a processor and a memory. The memory stores instructions executable by the processor to receive a two-dimensional image of an object from the two-dimensional image sensor, output, from a machine learning program trained to identify one or more references points in an input two-dimensional image, a reference point of the object in the two-dimensional image, when a similarity measure based on a distance between the reference point and a three-dimensional reference point is below a threshold, collect three-dimensional image data of the object from the three-dimensional image sensor, and output a new three-dimensional reference point based on the collected three-dimensional image data.

The instructions can further include instructions to deactivate the three-dimensional image sensor upon outputting the new three-dimensional reference point.

The instructions can further include instructions to reactivate the three-dimensional image sensor when the similarity measure is below the threshold.

The three-dimensional image sensor can be one of a stereo image sensor or a time-of-flight image sensor.

The instructions can further include instructions to identify the three-dimensional reference point from a reference three-dimensional image captured by the three-dimensional image sensor before the two-dimensional image sensor captured the two-dimensional image.

The image can include an occupant, and the reference point in the two-dimensional image is associated to a joint of the occupant.

The reference point can be an object keypoint, and the similarity measure can be an object keypoint similarity measure.

The distance can be a Euclidean distance between the reference point and the three-dimensional reference point.

The instructions can further include instructions to actuate a vehicle component based on the output reference point.

A system includes a computer including a processor and a memory. The memory stores instructions executable by the processor to collect a two-dimensional image of a vehicle occupant in a vehicle, input the collected two-dimensional image to a machine learning program trained to output one or more reference points of the vehicle occupant, each reference point being a landmark of the vehicle occupant, output, from the machine learning program, one or more reference points of the vehicle occupant in the two-dimensional image, determine a location of the vehicle occupant in an interior of the vehicle based on the one or more reference points, actuate a vehicle component based on the determined location, and, for each of the one or more reference points, determine a similarity measure between the reference point and a three-dimensional reference point, the similarity measure based on a distance between the reference point and the three-dimensional reference point.

The instructions can further include instructions to actuate a three-dimensional image sensor to collect three-dimensional image data and to deactivate the three-dimensional image sensor upon generating a new three-dimensional reference point based on the three-dimensional image data.

The instructions can further include instructions to reactivate the three-dimensional image sensor when a similarity measure between the new three-dimensional reference point and one of the one or more reference points of the vehicle occupant in the image is below a threshold.

The instructions can further include instructions to identify a plurality of reference points in the two-dimensional image and to identify an action performed by the vehicle occupant based on the plurality of reference points.

The instructions can further include instructions to actuate one or more vehicle components based on the identified action.

The instructions can further include instructions to identify the three-dimensional reference point from a previously collected three-dimensional image.

At least one of the one or more reference points in the two-dimensional image can be associated to a joint of the vehicle occupant.

The instructions can further include instructions to actuate a safety device based on the location of the vehicle occupant in the vehicle.

The instructions can further include instructions to rotate an air vent toward the vehicle occupant based on the location of the vehicle occupant in the vehicle.

A method includes collecting a two-dimensional image of a vehicle occupant in a vehicle, input the collected two-dimensional image to a machine learning program trained to output one or more reference points of the vehicle occupant, each reference point being a landmark of the vehicle occupant, outputting, from the machine learning program, one or more reference points of the vehicle occupant in the two-dimensional image, determining a location of the vehicle occupant in an interior of the vehicle based on the one or more reference points, actuating a vehicle component based on the determined location, and, for each of the one or more reference points, determining a similarity measure between the reference point and a three-dimensional reference point, the similarity measure based on a distance between the reference point and the three-dimensional reference point.

The method can further include actuating a three-dimensional image sensor to collect three-dimensional image data and deactivating the three-dimensional image sensor upon generating a new three-dimensional reference point based on the three-dimensional image data.

The method can further include reactivating the three-dimensional image sensor when a similarity measure between the new three-dimensional reference point and one of the one or more reference points of the vehicle occupant in the image is below a threshold.

The method can further include identifying a plurality of reference points in the two-dimensional image and identifying an action performed by the vehicle occupant based on the plurality of reference points.

The method can further include actuating one or more vehicle components based on the identified action.

The method can further include identifying the three-dimensional reference point from a previously collected three-dimensional image.

The method can further include actuating a safety device based on the location of the vehicle occupant in the vehicle.

The method can further include rotating an air vent toward the vehicle occupant based on the location of the vehicle occupant in the vehicle.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Collecting images with a three-dimensional image sensor can provide millimeter-precision position data of an occupant in a vehicle, and a computer in the vehicle can use the position data to actuate vehicle components, such as safety devices and air vents. The three-dimensional image sensor uses more computational resources than other sensors, and the computer may allocate computational resources to the three-dimensional image sensor that may have otherwise been allocated to other sensors and components.

A two-dimensional image sensor can collect centimeter-precision position data of the occupant based on two-dimensional images. The two-dimensional images are input to an image processing machine learning program such as a neural network to output depth data from the two-dimensional image sensor to the object in the two-dimensional image, providing three-dimensional position data from a two-dimensional image. The two-dimensional image sensor uses fewer computational resources than the three-dimensional image sensor, freeing computational resources of the vehicle computer for use by other sensors and components. The machine learning program can be trained with reference three-dimensional image data to output the depth data based on three-dimensional reference points identified in the reference three-dimensional image data. However, the machine learning program may output depth data that are imprecise relative to the three-dimensional reference points. For example, when a similarity measure based on a distance between reference points output from the machine learning program and the three-dimensional reference points is below a threshold, the computer can determine to retrain the machine learning program with new reference data.

To retrain the machine learning program, the computer can collect reference images of the vehicle occupants with the three-dimensional image sensor. That is, because the three-dimensional image sensor uses more computational resources than the two-dimensional image sensor, the computer can selectively actuate the three-dimensional image sensor to collect three-dimensional reference data to retrain the machine learning program and then input two-dimensional images to the machine leaning program to determine three-dimensional position data of the vehicle occupant. Thus, the computer generates three-dimensional position data with the precision of three-dimensional images collected by the three-dimensional image sensor at the computational cost of the two-dimensional image sensor. Thus, systems and methods disclosed herein reduce a number of computations performed by the computer and can reduce power consumption by the computer and/or sensors and or can free computational resources for other sensors and components.

FIG. 1 illustrates an example system 100 for actuating sensors 115 in a vehicle 105. A computer 110 in the vehicle 105 is programmed to receive collected data from one or more sensors 115. For example, vehicle 105 data may include a location of the vehicle 105, data about an environment around a vehicle, data about an object outside the vehicle such as another vehicle, etc. A vehicle 105 location is typically provided in a conventional form, e.g., geo-coordinates such as latitude and longitude coordinates obtained via a navigation system that uses the Global Positioning System (GPS). Further examples of data can include measurements of vehicle 105 systems and components, e.g., a vehicle 105 velocity, a vehicle 105 trajectory, etc.

The computer 110 is generally programmed for communications on a vehicle 105 network, e.g., including a conventional vehicle 105 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices that detect physical phenomena. For example, various controllers in a vehicle 105 may operate as sensors 115 to provide data via the vehicle 105 network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at the server 130. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation—such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle 105 network.

A vehicle 105 can operate in one of a fully autonomous mode, a semiautonomous mode, or a non-autonomous mode. A fully autonomous mode is defined as one in which each of vehicle 105 propulsion (typically via a powertrain including an electric motor and/or internal combustion engine), braking, and steering are controlled or monitored by the computer 110. A semi-autonomous mode is one in which at least one of vehicle 105 propulsion (typically via a powertrain including an electric motor and/or internal combustion engine), braking, and steering are controlled or monitored at least partly by the computer 110 as opposed to a human operator. In a non-autonomous mode, i.e., a manual mode, the vehicle 105 propulsion, braking, and steering are controlled or monitored by the human operator.

The system 100 can further include a network 125 connected to a server 130. The computer 110 can further be programmed to communicate with one or more remote sites such as the server 130, via the network 125, such remote site possibly including a processor and a memory. The network 125 represents one or more mechanisms by which a vehicle computer 110 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
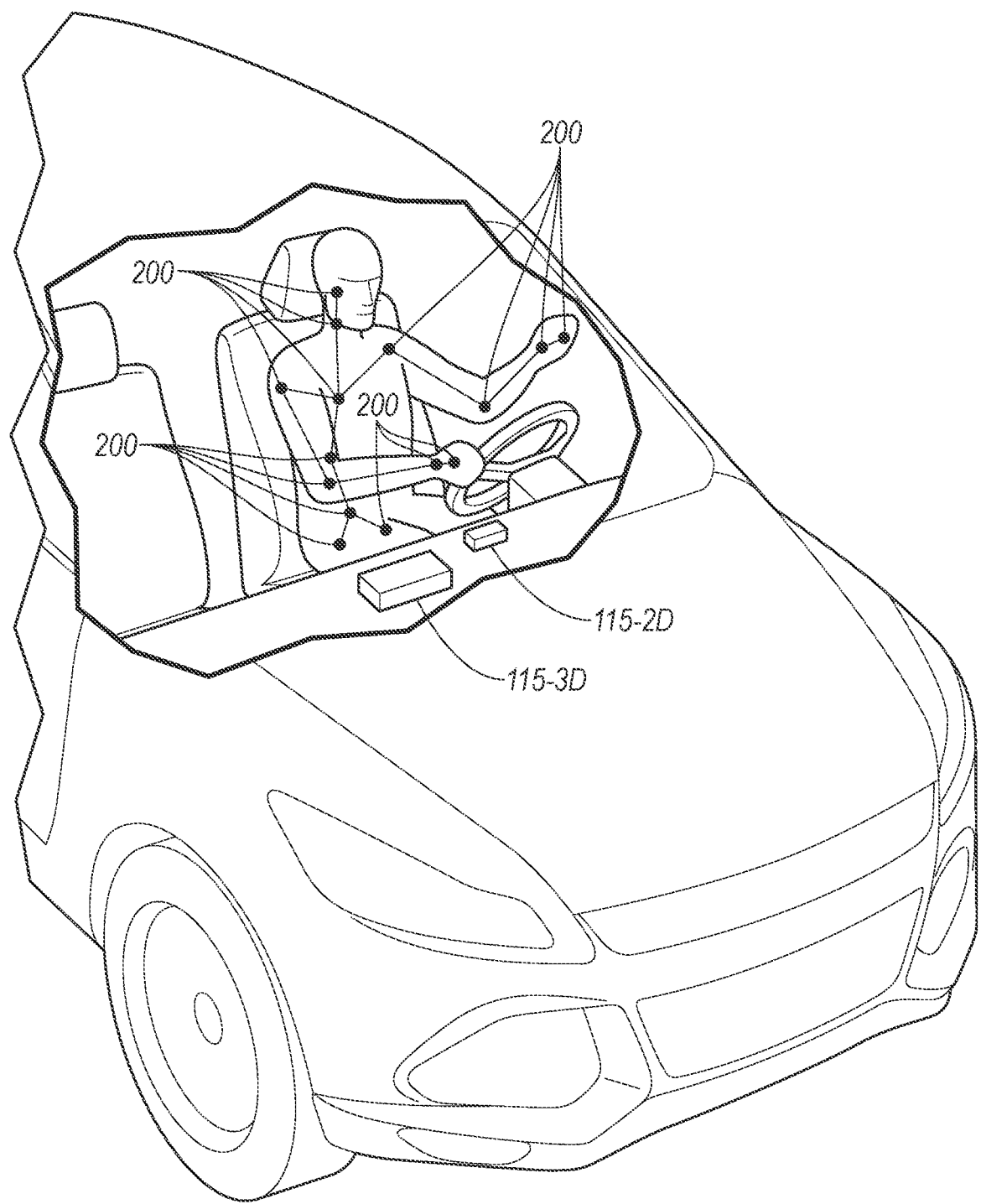
FIG. 2 is a perspective view of a vehicle occupant in the vehicle.

FIG. 2 is a perspective view of a vehicle 105. An occupant in a vehicle seat can operate the vehicle 105. That is, the occupant can be an operator of the vehicle 105, actuating one or more components 120 to move the vehicle 105. The vehicle 105 can include a two-dimensional (2D) image sensor 115-2D. A 2D image sensor 115-2D collects image data as a two-dimensional set of data, i.e., a two-dimensional array of values. Thus, the images collected by the 2D image sensor 115-2D can define two dimensions of distance, e.g., a height and a width, of objects detected in the images.

The vehicle 105 can include a three-dimensional (3D) image sensor 115-3D. The 3D image sensor 115-3D collects image data as a three-dimensional set of data, i.e., a three-dimensional array of values. For example, the 3D image sensor 115-3D can be a time-of-flight sensor or a stereo image sensor. When the 3D image sensor 115-3D is a time-of-flight sensor, the 3D image sensor 115-3D emits a signal, receives a reflection of the signal from the vehicle occupant, and, based on a time elapsed between emission of the signal and receipt of the reflected signal, determines a 3D position of the object from which the signal reflected. When the 3D image sensor 115-3D is a stereo image sensor, the 3D image sensor 115-3D includes two 2D image sensors 115-2D spaced at a specified distance, collects a respective 2D image from each 2D image sensor 115-2D, and, based on the specified distance and the 2D images, determines the 3D position of objects in the 2D images.

The images collected by the 3D image sensor 115-3D can define three dimensions of distance, e.g., a height, and width, and a depth, of objects detected in the images. The "depth" is a distance from the 3D image sensor 115-3D to the object detected in the 3D image in the vehicle-rearward direction. That is, the depth is the third dimension captured by the 3D image sensor 115-3D that is not detected by the 2D image sensor 115-2D. The images collected by the 3D image sensor 115-3D can have a finer resolution than the images collected by the 2D image sensor 115-2D. Because the 3D image sensor 115-3D collects 3D images that have finer resolutions and include more data than 2D images collected by the 2D image sensor 115-2D, the 3D image sensor 115-3D uses more computational capacity of the computer 110 than the 2D image sensor 115-2D. For example, the 3D image sensor 115-3D can use 500 gigaflops of computing speed to collect 3D images that have a 1 millimeter resolution, and the 2D image sensor 300 can use 50 gigaflops of computing speed to collect 2D images that have a 10 millimeter resolution. Thus, collecting 2D images uses fewer computing resources and memory space than 3D images, at the cost of lower resolution and no depth data that 3D images provide.

The computer 110 can, based on the 2D images collected with the 2D image sensor 115-2D, identify a plurality of detected reference points 200. The reference points 200 are points of interest in the 2D image that the computer 110 can identify to actuate one or more components 120. For example, the reference points 200 can each be associated to a joint or other body party of the occupant. The computer 110 can identify connections between the reference points

200. The connections can each be associated to a body part of the occupant connecting two of the reference points 200. That is, the computer 110 can identify a connection between two reference points 200 when the computer 110 determines that a body part connects the body parts associated to the reference points 200, and the computer 110 can determine not to identify a connection when no body part connects the reference points 200.

The computer 110 can input the 2D images to a machine learning program to identify the reference points 200. The machine learning program can be a conventional neural network trained for processing images, e.g., OpenPose, Google Research and Machine Intelligence (G-RMI), DL-61, etc. For example, OpenPose receives, as input, a 2D image and identifies reference points 200 in the 2D image corresponding to human body parts, e.g., hands, feet, joints, etc. OpenPose inputs the 2D image to a plurality of convolutional layers that, based on training with a reference dataset such as Alpha-Pose, identify keypoints in the 2D image and output the keypoints as the reference points 200. The reference points 200 include depth data that the 2D image alone does not include, and the computer 110 can use a machine learning program such as OpenPose to determine the depth data to identify a 3D position of the vehicle occupant in the 2D images. That is, the machine learning program outputs the reference points 200 as a set of three values: a length along a first axis of a 2D coordinate system in the 2D image, a width along a second axis of the 2D coordinate system in the 2D image, and a depth from the 2D image sensor 115-2D to the vehicle occupant, the depth typically being a distance along a third axis normal to a plane defined by the first and second axes of the 2D image.

Based on the 3D position of the vehicle occupant defined by the reference points 200 in each 2D image, as described above, the computer 110 can identify an action performed by the vehicle occupant. That is, as the reference points 200 in the 2D images indicate that the vehicle occupant is moving in the vehicle 105, the computer 110 can identify an action that the vehicle occupant has performed or is about to perform. For example, if the reference points 200 indicate that a hand of the vehicle occupant is moving toward a climate controller, the computer 110 can identify that the action of the vehicle occupant is to actuate the climate controller. In another example, if the reference points 200 indicate that a 3D position of the occupant is closer to the 2D image sensor than a previously determined 3D position, the computer 110 can determine that the vehicle occupant has moved a vehicle seat closer to a steering wheel.

Based on the identified action of the vehicle occupant identified by the reference points 200, the computer 110 can actuate one or more vehicle components 120. That is, certain components 120 can be actuated in a manner to direct a function or feature toward the vehicle occupant, and the computer 110 can use the determined 3D position of the vehicle occupant to actuate the components 120 toward the vehicle occupant. For example, the computer 110 can determine a head position of the vehicle occupant based on one of the reference points 200 and can adjust a window shading to reduce sunlight entering a window based on the head position of the vehicle occupant. The computer 110 can detect a portion of the window through which sunlight passes and intersects with the 3D position of the vehicle occupant. The sunlight may reduce visibility of the vehicle occupant, and the computer 110 can actuate a photochromic element in the window to increase an opacity of the window, reducing the sunlight passing through the window. The computer 110 can compare the two-dimensional area of the window to the 3D position of the vehicle occupant to identify a portion of the window through which sunlight passes and reaches the vehicle occupant's head. The computer 110 can actuate the photochromic element in the portion of the window, increasing the opacity only in the identified portion of the window to reduce sunlight passing through the portion of the window. For example, empirical testing and/or simulation can be performed to create a lookup table or the like specifying, for a 3D position (or range of 3D positions) of an occupant's head, a target opacity of a window.

In another example, when the computer 110 determines that the action of the vehicle occupant is actuating the climate controller, the computer 110 can rotate an air vent toward the 3D position of the vehicle occupant to direct heated or cooled air to the vehicle occupant. The computer 110 has, stored in the memory, the current 3D position of the air vent and possible 3D positions of the air vent caused by rotating the air vent. The air vent can include a motor that rotates the air vent about an axis and directs the flow direction from the air vent toward specified portions of the vehicle 105 defined by stored 3D positions in the memory. The computer can predict a flow direction and flow speed of air based on conventional fluid mechanics techniques, e.g., potential flow, computational fluid dynamics, etc. The computer 110 can compare the predicted flow direction and flow speed of the air to the 3D position of the vehicle occupant to determine whether the air from the air vent will reach the vehicle occupant. The computer 110 can determine a rotation angle that moves the flow of the air, as determined by the predicted flow direction and predicted flow speed, within a threshold of the 3D position of the vehicle occupant, such that air flow from the air vent reaches the vehicle occupant. The computer 110 can then actuate the motor to rotate the air vent to the rotation angle, directing the air vent and the air flow toward the vehicle occupant. Empirical testing and/or simulation can be performed to create a lookup table or the like specifying, for a 3D position (or range of 3D positions) of one or more parts of an occupant's body, e.g., their head, an arm, etc., an angle (or angles, e.g., with respect to horizontal and vertical planes) of rotation of a vent. Upon collecting additional 2D images and determining a new 3D position of the vehicle occupant, the computer 110 can determine a new rotation angle and rotate the air vent to the new rotation angle to direct the air flow from the air vent to the vehicle occupant.

In yet another example, when the computer 110 determines that a position of the vehicle seat is closer to the steering wheel than a previously determined position, the computer 110 can actuate a safety device based on the current position of the vehicle seat and the occupant in the seat. In such an example, the computer 110 can adjust an inflation pressure setting of a steering wheel airbag such that, when the steering wheel airbag is in an inflated position, a reaction surface of the steering wheel airbag reaches the current 3D position of the vehicle occupant, e.g., as determined by empirical testing and/or simulation. In yet another example, the computer 110 can identify a head of the vehicle occupant, as described above, and actuate a speaker in the vehicle 105 to output an audio message toward the head of the vehicle occupant. In yet another example, the computer 110 can compare the 3D position of the vehicle occupant to a stored 3D position in which the vehicle occupant is positioned in a conventional manner, i.e., facing in a vehicle-forward direction, seated in a vehicle seat, and limbs within an occupant seating area. When the 3D position of the vehicle occupant deviates from the stored 3D position by a threshold amount, the computer 110 can determine that the vehicle occupant is "out-of-position," i.e., not seated in a conventional manner, and can adjust actuation of one or more safety devices based on the out-of-position vehicle occupant. For example, the computer 110 can, upon identifying that the vehicle occupant's arms are extended out of a window based on the 3D position of the vehicle occupant, deactivate a roof-located side curtain airbag that extends over the window through which the occupant's arm is located.

Figure 3:
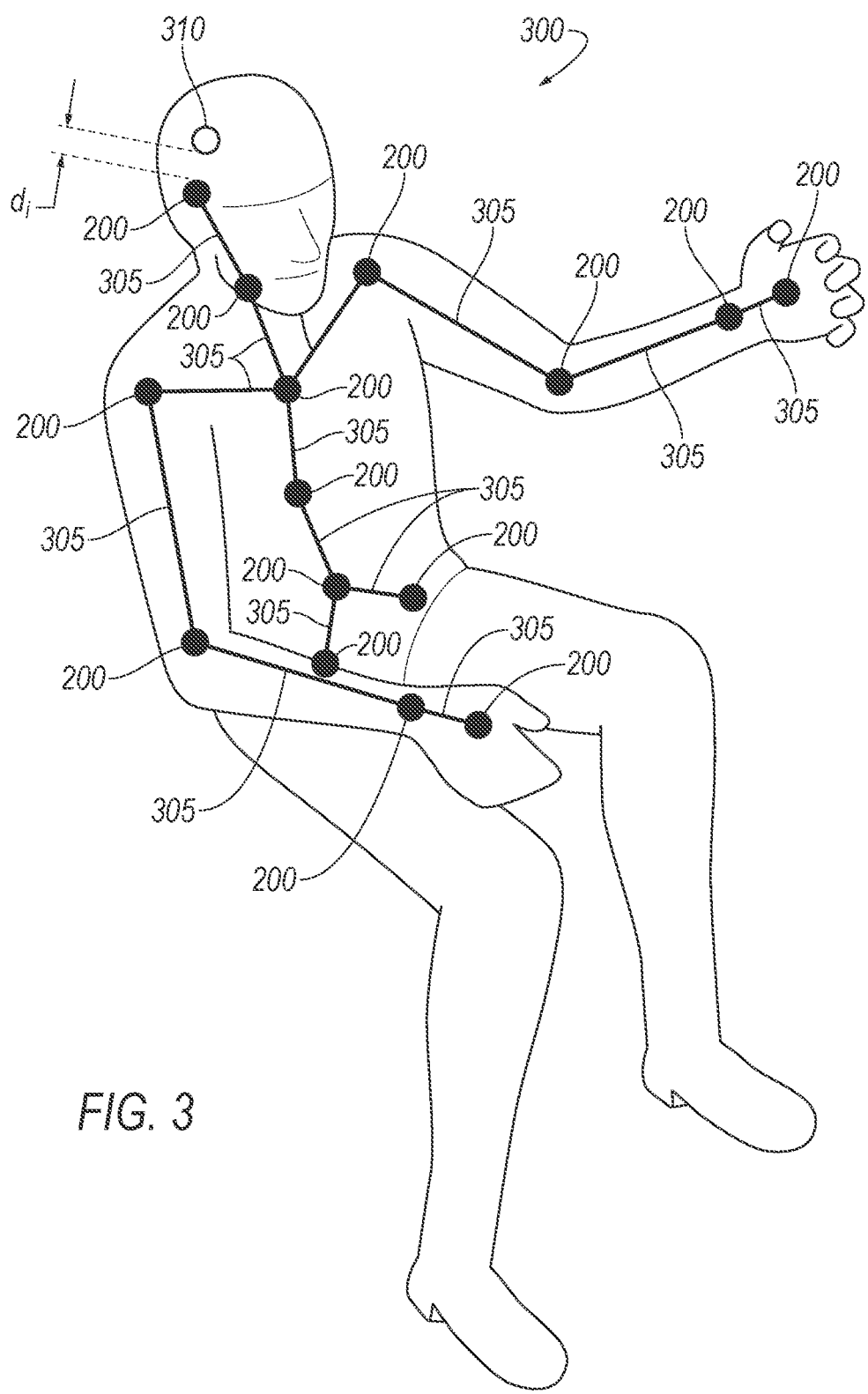
FIG. 3 is a view of an example image of the vehicle occupant.

FIG. 3 is a view of an image 300 of an occupant collected by the 2D image sensor 115-2D. The image 300 includes a plurality of reference points 200 and connections 305 between the reference points 200. The computer 110 can, based on the reference points 200 and connections 305, identify an action performed by the vehicle occupant and actuate one or more vehicle components 120, as described above. That is, the reference points 200 and connections 305 represent body parts of the vehicle occupant, and the computer 110 can predict a 3D position and movement of the vehicle occupant based on the changes to the reference points 200 and connections 305 in successive 2D images collected by the 2D image sensor 115-2D.

The computer 110 can compare each detected reference point 200 to a corresponding three-dimensional (3D) reference point 310. FIG. 3 illustrates a single 3D reference point 310, and the computer 110 can identify a plurality of 3D reference points 310. The 3D reference point 310 is a three-dimensional set of data that includes a depth value from the 3D image sensor 115-3D to the vehicle occupant, as described above. The computer 110 can identify a plurality of 3D reference points 310 from 3D images previously collected by the three-dimensional image sensor 115-3D. The machine learning program predicts a depth value to the reference point 200, as described above, and the computer 110 can actuate the components 120 based on this predicted depth value from the reference point 200 determined from images from the 2D image sensor 115-2D rather than the detected depth value from 3D images collected by the 3D image sensor 115-3D. Thus, based on the reference points 200 in the 2D image alone, the computer 110 can predict the 3D position and movement of the vehicle occupant and actuate components 120 based on the 3D position and movement.

The computer 110 can determine a similarity measure between the reference points 200 and the 3D reference points 310. The similarity measure is a measure of distance between the references points 200 identified in the 2D image from the 3D reference points 310 determined in the 3D image. The similarity measure thus measures how precisely the 2D image of an object maps to a 3D image of the same object. The computer 110 can determine the similarity measure as an object keypoint similarity OKS where each reference point 200 is a "keypoint," e.g., as described by Equation 1:

$$OKS = \frac{\sum_i e^{-\frac{d_i^2}{2s^2 k_i^2}} \delta(v_i > 0)}{\sum_i \delta(v_i > 0)} \quad (1)$$

where $\Sigma_i$ is the summation function for the i reference points 200, $d_i$ is a Euclidean distance of the ith detection point 200 to its corresponding 3D reference point 310, $s \cdot k_i$ is the standard deviation of the distance $d_i$ from a mean of all i distances $d_i$, $v_i$ is a binary value indicating whether the ith 3D reference point 310 is visible in the image 300, with $v_i=1$ indicating that the ith 3D reference point 310 is visible in the image 300 and $v_i=0$ indicating that the ith 3D reference point 310 is not visible in the image 300, and $\delta(v_i>0)$ is an integer value indicating the number of visibility values $v_i$ exceeding 0. Thus, the object keypoint similarity OKS measures a statistical distance of the reference points 200 from the 3D reference points 310. That is, OKS=1 means that the reference points 200 and the 3D reference points 310 align without any distance $d_i$ between them, and the similarity measure can reduce toward a limiting value of 0 as the distances $d_i$ between the reference points 200 and the 3D reference points 310 increase.

When the similarity measure is below a threshold, the computer 110 can determine to retrain the machine learning program. That is, when the similarity measure is below the threshold, the computer 110 can determine that the machine learning program is no longer identifying the reference points 200 with sufficient confidence to use for actuating vehicle components 120. The threshold can be determined based on a conventional statistical standard, e.g., a 95% confidence interval. That is, the threshold can be 0.95, indicating that the computer 110 can use the reference points 200 identified by the machine learning program when the reference points 200 are within two standard deviations of a mean distance between each reference point 200 and its corresponding 3D reference point 310.

To retrain the machine learning program, the computer 110 can actuate the 3D image sensor 115-3D to collect 3D image data of the vehicle occupant. As described above, the 3D images include depth data that the machine learning program interprets as the 3D reference points 310. The computer 110 can reactivate the 3D image sensor 115-3D when the similarity measure is below the threshold. Upon collecting the 3D image data, the computer 110 can deactivate the 3D image sensor, preserving computing resources and processing power of the computer 110. The computer 110 can then determine the 3D reference points 310 in the 3D images.

The computer 110 can generate a training set of data with the collected 3D images. The computer 110 adds the collected 3D image to a previously determined data set of reference images, as described above. The computer 110 inputs the training set to the machine learning program and retrains the machine learning program until the computer 110 determines that the machine learning program outputs reference points 200 with sufficient confidence. For example, the computer 110 can adjust one or more weights of the machine learning program until the similarity measure of an output of the machine learning program is above the threshold. Upon retraining the machine learning program, the computer 110 can collect 2D images with the 2D image sensor 115-2D and actuate components 120 based on reference points 200 identified in the 2D images, as described above.

Figure 4:
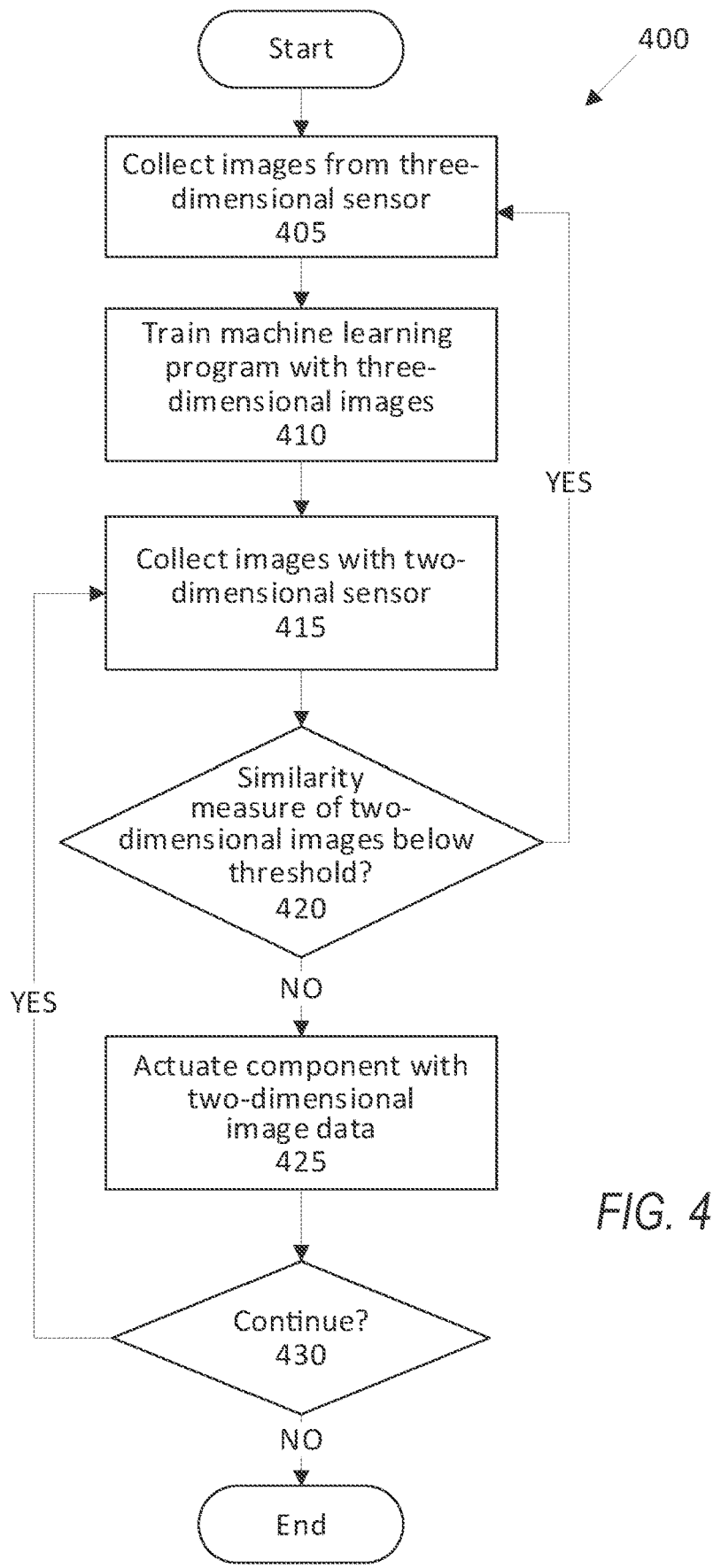
FIG. 4 is a block diagram of an example process for actuating sensors in the vehicle.

FIG. 4 is a block diagram of an example process 400 for collecting data in a vehicle 105. The process begins in a block 405, in which a computer 110 in a vehicle 105 collects three-dimensional image data of a vehicle occupant with a 3D image sensor 115-3D. As described above, the 3D image sensor 115-3D can be, e.g., a time-of-flight sensor, a stereo image sensor, etc. The 3D image data include depth data from the 3D image sensor 115-3D to the vehicle occupant captured by the images. Upon collecting the 3D images, the computer 110 deactivates the 3D image sensor 115-3D, reducing use of computing resources of the computer 110.

Next, in a block 410, the computer 110 trains a machine learning program with the 3D image data. As described above, the machine learning program can be trained to output one or more reference points 200 indicating a depth in a 2D image from a 2D image sensor 115-2D to the vehicle occupant. The machine learning program can be initially trained with reference 3D data, and the computer 110 can retrain the machine learning program with the 3D images when the similarity measure is below a threshold, as described above. The computer 110 can identify depth data in the 3D images can be 3D reference points 310. Based on the 3D reference points 310, the computer 110 can adjust weights and/or biases of the machine learning program until a cost function is minimized. In the example process 400, the computer 110 of the vehicle 105 can train the machine learning program while the vehicle 105 is operating on a roadway. Alternatively or additionally, the computer 110 can collect the 3D image data and train the machine learning program at a later time, e.g., when the vehicle 105 has stopped and powered off. That is, the block 410 may be omitted from the process 400 or performed at a different time than following the block 405 and prior to the block 415.

Next, in a block 415, the computer 110 collects 2D images with the 2D image sensor 115-2D. As described above, the 2D image sensor 115-2D uses fewer computing resources than the 3D image sensor 115-3D, and the 2D images use less space in a memory of the computer 110 than 3D images. The computer 110 can actuate the 2D image sensor 115-2D to collect 2D images of the vehicle occupant.

Next, in a block 420, the computer 110 determines whether a similarity measure between reference points 200 of the 2D images and the 3D reference points 310 of the 3D images collected by the 3D image sensor 115-3D is below a threshold. As described above, the similarity measure is based on a Euclidean distance between one of the reference points 200 and a corresponding 3D reference point 310. The similarity measure is a measure of the precision with which the machine learning program identifies a depth value of an object in the 2D image. The similarity measure can be, e.g., an object keypoint similarity, as described above. If the similarity measure of reference points 200 of one or more of the 2D images is below a threshold, the process 400 returns to the block 405 to collect additional data and retrain the machine learning program. Otherwise, the process 400 continues in a block 425.

In the block 425, the computer 110 actuates one or more components 120 based on the 2D image data. The reference points 200 and connections 305 output by the machine learning program output for each 2D image describe a 3D position of the occupant, and the computer 110 can determine 3D movement of the vehicle occupant based on changes to the 3D position occupant between respective outputs of each 2D image. For example, the machine learning program can be a conventional image processing program such as OpenPose, described above, that determines the 3D position of the occupant based on the reference points 200 in a 2D image, and the computer 110 can determine the movement of the occupant based on respective 3D positions of a plurality of 2D images. In one example of actuation of the components 120, the computer 110 can specify an inflation pressure of an airbag of an airbag based on the reference points 200 identified by the machine learning program to inflate such that a reaction surface of the airbag reaches the 3D position of the vehicle occupant. In another example, the computer 110 can actuate a motor adjust a rotation angle of an air vent. The adjusted rotation angle changes a flow direction of air from the air vent is directed toward the 3D position of the vehicle occupant to direct heated or cooled air toward the occupant.

Next, in a block 430, the computer 110 determines whether to continue the process 400. For example, the computer 110 can determine to continue the process 400 upon determining that the vehicle 105 is still in motion. In another example, the computer 110 can determine not to continue the process if the vehicle 105 has stopped and powered off. If the computer 110 determines to continue, the process 400 returns to the block 415 to collect additional 2D images. Otherwise, the process 400 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

Ordinal adjectives such as "first" and "second" are used throughout this document as identifiers and are not intended to signify importance or order.

The invention claimed is:

1. A system, comprising:
a three-dimensional image sensor;
a two-dimensional image sensor; and
a computer communicatively coupled to the three-dimensional image sensor and the two-dimensional image sensor, the computer including a processor and a memory, the memory storing instructions executable by the processor to:
receive a two-dimensional image of an object from the two-dimensional image sensor;
output, from a machine learning program trained to identify one or more reference points in an input two-dimensional image, a reference point of the object in the two-dimensional image;
when a similarity measure based on a distance between the reference point and a three-dimensional reference point is below a threshold, collect three-dimensional image data of the object from the three-dimensional image sensor;
output a new three-dimensional reference point based on the collected three-dimensional image data; and
deactivate the three-dimensional image sensor upon outputting the new three-dimensional reference point.

2. The system of claim 1, wherein the three-dimensional image sensor is one of a stereo image sensor or a time-of-flight image sensor.

3. The system of claim 1, wherein the instructions further include instructions to identify the three-dimensional reference point from a reference three-dimensional image captured by the three-dimensional image sensor before the two-dimensional image sensor captured the two-dimensional image.

4. The system of claim 1, wherein the image includes an occupant, and the reference point in the two-dimensional image is associated to a joint of the occupant.

5. The system of claim 1, wherein the reference point is an object keypoint, and the similarity measure is an object keypoint similarity measure.

6. The system of claim 1, wherein the distance is a Euclidean distance between the reference point and the three-dimensional reference point.

7. The system of claim 1, wherein the instructions further include instructions to actuate a vehicle component based on the output reference point.

8. A system, comprising a computer including a processor and a memory, the memory storing instructions executable by the processor to:
collect a two-dimensional image of a vehicle occupant in a vehicle;
input the collected two-dimensional image to a machine learning program trained to output one or more reference points of the vehicle occupant, each reference point being a landmark of the vehicle occupant;
output, from the machine learning program, one or more reference points of the vehicle occupant in the two-dimensional image;
determine a location of the vehicle occupant in an interior of the vehicle based on the one or more reference points;
actuate a vehicle component based on the determined location;
for each of the one or more reference points, determine a similarity measure between the reference point and a three-dimensional reference point, the similarity measure based on a distance between the reference point and the three-dimensional reference point;
actuate a three-dimensional image sensor to collect three-dimensional image data; and
deactivate the three-dimensional image sensor upon generating a new three-dimensional reference point based on the three-dimensional image data.

9. The system of claim 8, wherein the three-dimensional image sensor is one of a stereo image sensor or a time-of-flight image sensor.

10. The system of claim 8, wherein the instructions further include instructions to identify a plurality of reference points in the two-dimensional image and to identify an action performed by the vehicle occupant based on the plurality of reference points.

11. The system of claim 10, wherein the instructions further include instructions to actuate one or more vehicle components based on the identified action.

12. The system of claim 8, wherein the instructions further include instructions to identify the three-dimensional reference point from a previously collected three-dimensional image.

13. The system of claim 8, wherein at least one of the one or more reference points in the two-dimensional image is associated to a joint of the vehicle occupant.

14. The system of claim 8, wherein each reference point is an object keypoint, and the similarity measure is an object keypoint similarity measure.

15. The system of claim 8, wherein the instructions further include instructions to actuate a safety device based on the location of the vehicle occupant in the vehicle.

16. The system of claim 8, wherein the instructions further include instructions to rotate an air vent toward the vehicle occupant based on the location of the vehicle occupant in the vehicle.

17. A system, comprising:
a three-dimensional image sensor;
a two-dimensional image sensor; and
a computer communicatively coupled to the three-dimensional image sensor and the two-dimensional image sensor, the computer including a processor and a memory, the memory storing instructions executable by the processor to:
receive a two-dimensional image of an object from the two-dimensional image sensor;
output, from a machine learning program trained to identify one or more reference points in an input two-dimensional image, a reference point of the object in the two-dimensional image;

when a similarity measure based on a distance between the reference point and a three-dimensional reference point is below a threshold, collect three-dimensional image data of the object from the three-dimensional image sensor;

output a new three-dimensional reference point based on the collected three-dimensional image data; and reactivate the three-dimensional image sensor when the similarity measure is below the threshold.

18. The system of claim 17, wherein the three-dimensional image sensor is one of a stereo image sensor or a time-of-flight image sensor.

19. The system of claim 17, wherein the image includes an occupant, and the reference point in the two-dimensional image is associated to a joint of the occupant.

20. The system of claim 17, wherein the reference point is an object keypoint, and the similarity measure is an object keypoint similarity measure.

21. The system of claim 17, wherein the instructions further include instructions to actuate a vehicle component based on the output reference point.

22. A system, comprising a computer including a processor and a memory, the memory storing instructions executable by the processor to:

collect a two-dimensional image of a vehicle occupant in a vehicle;

input the collected two-dimensional image to a machine learning program trained to output one or more reference points of the vehicle occupant, each reference point being a landmark of the vehicle occupant;

output, from the machine learning program, one or more reference points of the vehicle occupant in the two-dimensional image;

determine a location of the vehicle occupant in an interior of the vehicle based on the one or more reference points;

actuate a vehicle component based on the determined location;

for each of the one or more reference points, determine a similarity measure between the reference point and a three-dimensional reference point, the similarity measure based on a distance between the reference point and the three-dimensional reference point; and reactivate a three-dimensional image sensor when a similarity measure between a new three-dimensional reference point and one of the one or more reference points of the vehicle occupant in the image is below a threshold.

23. The system of claim 22, wherein the three-dimensional image sensor is one of a stereo image sensor or a time-of-flight image sensor.

24. The system of claim 22, wherein the instructions further include instructions to identify a plurality of reference points in the two-dimensional image and to identify an action performed by the vehicle occupant based on the plurality of reference points.

25. The system of claim 24, wherein the instructions further include instructions to actuate one or more vehicle components based on the identified action.

26. The system of claim 22, wherein the instructions further include instructions to identify the three-dimensional reference point from a previously collected three-dimensional image.

* * * * *